May 17, 1938.　　　　H. KREBS　　　　2,117,434
MOTOR VEHICLE
Filed Aug. 21, 1935
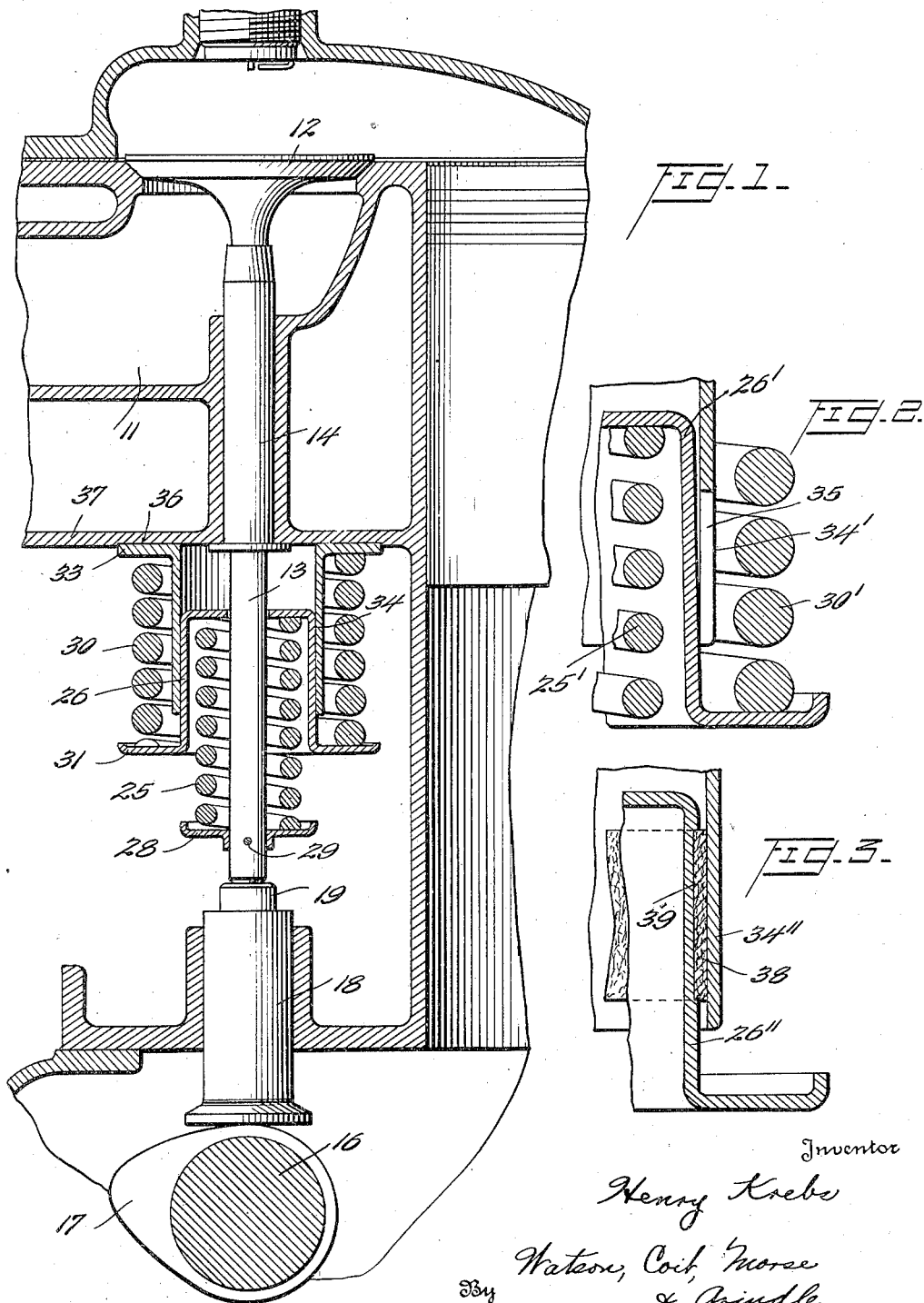
Inventor
Henry Krebs
By Watson, Coit, Morse & Grindle
Attorney Patented May 17, 1938

2,117,434

UNITED STATES PATENT OFFICE 2,117,434

MOTOR VEHICLE

Henry Krebs, Detroit, Mich., assignor to Packard Motor Car Company, Detroit, Mich., a corporation of Michigan Application August 21, 1935, Serial No. 37,249

11 Claims. (Cl. 123—188)

This invention relates to internal combustion engines and more particularly to improvements in the actuating mechanism for the valves of such engines.

As the result of relatively recent improvements in automotive engineering whereby extremely high motor vehicle speeds have become common, various motor troubles have developed by reason of the marked increase in the frequency of induced vibrations. This difficulty has been encountered in connection with the coil springs commonly used to seat the poppet valves which control the flow of intake and exhaust gases to and from the engine, these springs not infrequently breaking with consequent annoyance and expense to the vehicle operator. It will be appreciated that when an impulse is imparted to such a coiled valve spring as the valve is opened, the impulse travels the length of the spring and is reflected back. If the natural frequency of the spring is low, one such impulse will not be materially damped before one or more succeeding impulses are imparted to the spring, with the result that the spring is caused to surge, and the relatively violent vibrations to which the spring is subjected eventually cause crystallization of the metal and failure of the spring. This condition can be improved by increasing the natural frequency of the spring or by reducing the amplitude of the vibrations induced therein, but it is clear that in practice the characteristics of the spring will be controlled largely by the amount of lift which must be imparted to the valve and by the load required. Thus if the natural frequency of a coiled spring is increased by increasing the cross-sectional area of the convolutions or by reducing the number of convolutions, the desired valve lift and spring load cannot be secured.

It is therefore proposed by the present invention to decrease the magnitude of deflection of the spring and thereby the stress range, this result being achieved in the preferred form of the invention by the use of a yielding abutment for the spring. With such an arrangement the stress range applied to the spring is materially lowered; in other words, the difference between the stresses to which the spring is subjected in the open and closed valve positions is substantially lessened, from which it follows that there is much less likelihood of spring failure, it being possible to apply impulses of much higher frequency without failure if the stress range is sufficiently reduced.

It is a more specific object of the invention to provide an abutment for the usual coil compression spring associated with the poppet valve of an internal combustion engine which comprises a second coil spring having a higher rate than the first, the two springs thus acting in series. The first coil spring is the principal valve seating element and may have the conventional characteristics of rate and frequency of the single spring normally employed for that purpose. The second coil spring, which functions as an abutment, preferably has a higher rate and frequency, whereby the full lift can be applied to the valve with less deflection of the first spring but without otherwise materially altering the function of the first spring.

The invention also contemplates the employment of damping means, for instance a friction device, which may be associated with either or both of the springs. Surging of the principal valve spring is thus reduced not only as the result of the difference in frequencies of the two springs, which provides a yielding system having less pronounced periods of vibration, but also damps any undesired vibration resulting from surging without interference with the free action of the principal valve seating spring.

Further objects and features of the invention will be apparent from the following description taken in connection with the accompanying drawing, in which—

Figure 1 is a fragmentary sectional view of an engine block showing the valve chamber and illustrating the application of the invention to a conventional valve and valve actuating means;

Figure 2 is an enlarged sectional view of a portion of the structure shown in Figure 1 illustrating a slightly modified form; and Figure 3 is a sectional view corresponding to Figure 2 and illustrating a further modification.

In order to facilitate description of the invention reference will be made to the embodiment thereof illustrated in the accompanying drawing and specific language will be employed. It will be appreciated, however, that no limitation of the breadth of the invention is thereby intended and that such changes and alterations of the construction shown herein are contemplated as fall within the actual scope of the invention as defined in the claims appended hereto.

It will be observed that the valve illustrated in the drawing and the mechanism for opening the same are of the conventional type. Thus the engine block is shown as provided with gas passages 11 which may serve either to convey a combustible mixture to the associated combustion chambers of the engine or to convey exhaust gas therefrom, each passage being controlled by a valve 12 having a stem 13 which is supported for reciprocation in a sleeve 14. A cam shaft 16 having cam lobes 17 thereon engages and actuates the valve tappets 18, one of which is allocated to each valve, an adjustable abutment 19 in the outer end of the valve tappet contacting with and operating the valve stem 13 to open the passage 11 at the proper time. It will be appreciated that the means thus far described constitutes no essential part of the present invention so far as the details thereof are concerned, the invention being readily applicable to other types of valves and valve actuating mechanism.

The valve 12 is normally maintained in seated position principally by the action of a spring 25 which is preferably of the coil compression type and which is interposed between a generally cup-shaped sleeve 26 loosely surrounding the valve stem 13 and a collar 28 which is pinned to the valve stem as at 29. A yielding abutment which may comprise a second compression coil spring 30 is interposed between an annular flange 31 formed on the open end of the sleeve 26 and a flange 33 formed on a second sleeve 34, the flange 33 being seated in a depression 36 formed in a wall 37 of the engine block, and the sleeve 34 serving as a guide for the sleeve 26 which reciprocates therein.

It is preferred that the spring 25 have the characteristics of conventional valve springs, this spring having for instance a natural frequency of 23,000. The spring 30 is preferably of substantially higher rate and frequency, for instance a natural frequency of 40,000. As hereinbefore suggested, the rate, or the ratio of the increase in load to the resultant increase in deflection, of the spring 30 is substantially higher than the rate of the spring 25. Thus for a given valve lift, the extent of compression of the spring 25 is materially reduced since the sleeve 26 against which it abuts is displaced upwardly as the spring 30 is compressed, the amplitude of movement of the spring 25 and the range of stresses applied thereto being thereby lowered so that there is less possibility of failure. It may also be pointed out that the spring 25 is less likely to fail owing to the fact that the springs are of different frequency and less pronounced natural periods of vibration are inherent in the system.

Referring now to Figure 2, it will be observed that either the sleeve 26' or the sleeve 34', but preferably the former, is tapered in one direction, with the result that there is considerable friction developed between the sleeves as the sleeve 26' is reciprocated. Thus any motion of the spring 30' is resisted and damped, vibrations developed in the spring being dissipated in the form of heat. One of the sleeves, for instance sleeve 34', is preferably slotted as indicated at 35 to permit relative expansion and to prevent binding of the sleeves. Owing to the tapering of the sleeve 26', the degree of damping is greater as the amplitude of deflection of the spring 30' increases, and thus there is more effective damping of vibrations which tend to persist and build up to relatively large amplitude. The action of the springs 25' and 30' is, however, otherwise substantially the same in this form of the invention as in that shown in Figure 1.

The embodiment of the invention shown in Figure 3 is similar to that shown in Figure 2, frictional resistance between the sleeves 34'' and 26'' being increased by means of an annular sheet 38 of any well-known type of friction damping material which may be interposed between the two sleeves and seated in an annular recess 39 in one of them. Use may be made of various other forms of friction devices, and damping of either spring may be resorted to.

Various other alterations and modifications are contemplated such as would readily occur to one skilled in the art to which the invention relates.

Having thus described the invention, what is claimed as new and desired to be secured by Letters Patent is:

1. In an internal combustion engine, having an engine block provided with a passage for gas, a poppet valve movable to and from seating position to close and open said passage, and means including a cam for moving said valve from seating position, yielding means for moving said valve to seating position, said yielding means including a coil spring of conventional rate and a second coil spring of substantially higher rate constituting a yielding abutment for said first spring and acting in series therewith between said valve and engine block.

2. In an internal combustion engine, having an engine block provided with a passage for gas, a poppet valve movable to and from seating position to close and open said passage, and means including a cam for moving said valve from seating position, yielding means for moving said valve to seating position, said yielding means including a coil spring and a yielding abutment acting in series between said valve and said engine block, said yielding abutment having a higher natural frequency than said spring.

3. In an internal combustion engine, the combination with a poppet valve, of a coil compression spring of conventional rate for seating said valve, and a yielding abutment for said spring of higher rate, said abutment yielding prior to completion of opening of said valve, whereby the amplitude of movement of said spring is reduced.

4. In an internal combustion engine, the combination with a poppet valve, of two coil compression springs acting in series to seat said valve, one of said springs being deformable to a lesser extent than the other.

5. In an internal combustion engine, the combination with a poppet valve, of two coil compression springs acting in series to seat said valve, one of said springs being deformable to a lesser extent than the other, and means for damping the movement of one of said springs.

6. In an internal combustion engine, the combination with a poppet valve, of two coil compression springs acting in series to seat said valve, one of said springs having a higher rate than the other, and means for damping the movement of one of said springs, said last named means including a friction device resisting movement of the spring.

7. In an internal combustion engine, the combination with a poppet valve, of a coil compression spring of conventional rate for seating said valve, and a yielding abutment for said spring, said abutment comprising a second compression spring of substantially higher rate than said first spring and acting in series therewith.

8. In an internal combustion engine, the combination with a poppet valve, of a coil compression spring of conventional rate for seating said valve, and a yielding abutment for said spring, said abutment comprising a second coil compression spring of substantially higher rate than said first spring and acting in series therewith, and means for damping the movement of said second spring.

9. In an internal combustion engine, the combination with a poppet valve, of two coil compression springs acting in series to seat said valve, one of said springs having a substantially higher natural frequency than the other.

10. In an internal combustion engine, the combination with a poppet valve, of a torsion spring of conventional rate for seating said valve, and a yielding abutment for said spring, said abutment comprising a second torsion spring of substantially higher rate than said first spring and acting in series therewith, and means for damping the movement of said second spring.

11. In an internal combustion engine having an engine block provided with a passage for gas, a poppet valve movable to and from seating position to close and open said passage, and means including a cam for moving said valve from seating position, said cam and valve being so connected as to afford lost motion therebetween when said valve is seated, yielding means for moving said valve to seating position, said yielding means including two torsion springs acting in series between said valve and said engine block, one of said springs having a higher natural frequency than the other of said springs.

HENRY KREBS.